United States Patent [19]

Hanson

[11] 4,075,477
[45] Feb. 21, 1978

[54] OPTICAL-ELECTRONIC INTERFACE CONNECTOR

[75] Inventor: Richard J. Hanson, Warren, Ohio

[73] Assignee: General Motors Corporation, Detroit, Mich.

[21] Appl. No.: 779,312

[22] Filed: Mar. 21, 1977

[51] Int. Cl.² .............................................. G02B 5/16
[52] U.S. Cl. .................................. 250/227; 250/239; 350/96.20
[58] Field of Search ...................... 250/227, 239, 551; 350/96 B, 96 C

[56] References Cited

U.S. PATENT DOCUMENTS

| | | | |
|---|---|---|---|
| 3,790,791 | 2/1974 | Anderson | 250/227 |
| 3,792,284 | 2/1974 | Kaelin | 250/227 X |
| 3,878,397 | 4/1975 | Robb et al. | 250/227 X |

*Primary Examiner*—James B. Mullins
*Attorney, Agent, or Firm*—Robert M. Sigler

[57] ABSTRACT

Connecting means for interfacing the end of an optic signal conduit and electric signal conducting means comprises an optic-electronic conversion element having a body adapted to receive optic signals and one or more electrically conductive leads, a first housing member having an elongated portion adapted to receive the body on its free end with the leads extended therealong, a second housing member adapted to receive the end of the optic signal conduit and the elongated portion of the first housing member with the body in communication with the end of the optic signal conduit, an elastomeric ring having axially extending layers of alternating electrically conducting and insulated elastomeric material, the ring surrounding the elongated portion with the conducting layers in contact with the leads, and a third housing member adapted to receive the first housing members with the elastomeric ring therebetween and further including contacts communicating with the electrical signal conducting means and adapted to contact the electrically conducting layers in the elastomeric ring.

1 Claim, 6 Drawing Figures

OPTICAL-ELECTRONIC INTERFACE CONNECTOR

BACKGROUND OF THE INVENTION

This invention relates to connecting an interfacing means between the end of an optical signal conduit and electrical apparatus. Such interconnecting and interfacing means has utility in multiplexing systems wherein coded signals are generated by electrical apparatus and transmitted along an optic signal conduit to be received by further electrical apparatus. Such optical multiplexing systems may have use some day in motor vehicle electrical systems to replace the current electrical power system with its ever growing mass of wires and harnesses.

In order to be useful in such an environment, a proper interface connector for an optical multiplexing system must provide positive positioning between an included optic-electronic signal conversion element and the end of the fiber optic conduit, minimize complexity and expensive parts, provide simple service ability and repair, and mate with a printed circuit board. Prior art connectors have generally not been satisfactory in all these areas.

SUMMARY OF THE INVENTION

This invention provides a first housing member having an elongated portion adapted to receive at its free end the body of an optic-electronic signal conversion element and, along its sides, the leads of such element, a second housing member adapted to receive said elongated portion therein and further to receive the end of a fiber optic conduit in communication with the body of the optic-element signal conversion element, a ring of axially extending, alternating layers of electrically conducting and insulating elastomeric material disposed around the elongated portion between the first and second housing members with the conducting layers adapted to receive the leads of the optic-electronic signal conversion element in contact therewith, and a third housing member adapted to receive the first and second housing members therein and including one more internal electric contacts adapted to contact the electrically conducting layers in the elastomeric ring and having means communicating these contacts with the electrical apparatus.

Further details and advantages of this invention will be apparent from the accompanying drawings and following description of a preferred embodiment.

DESCRIPTION OF THE PREFERRED EMBODIMENT

Figure 6:
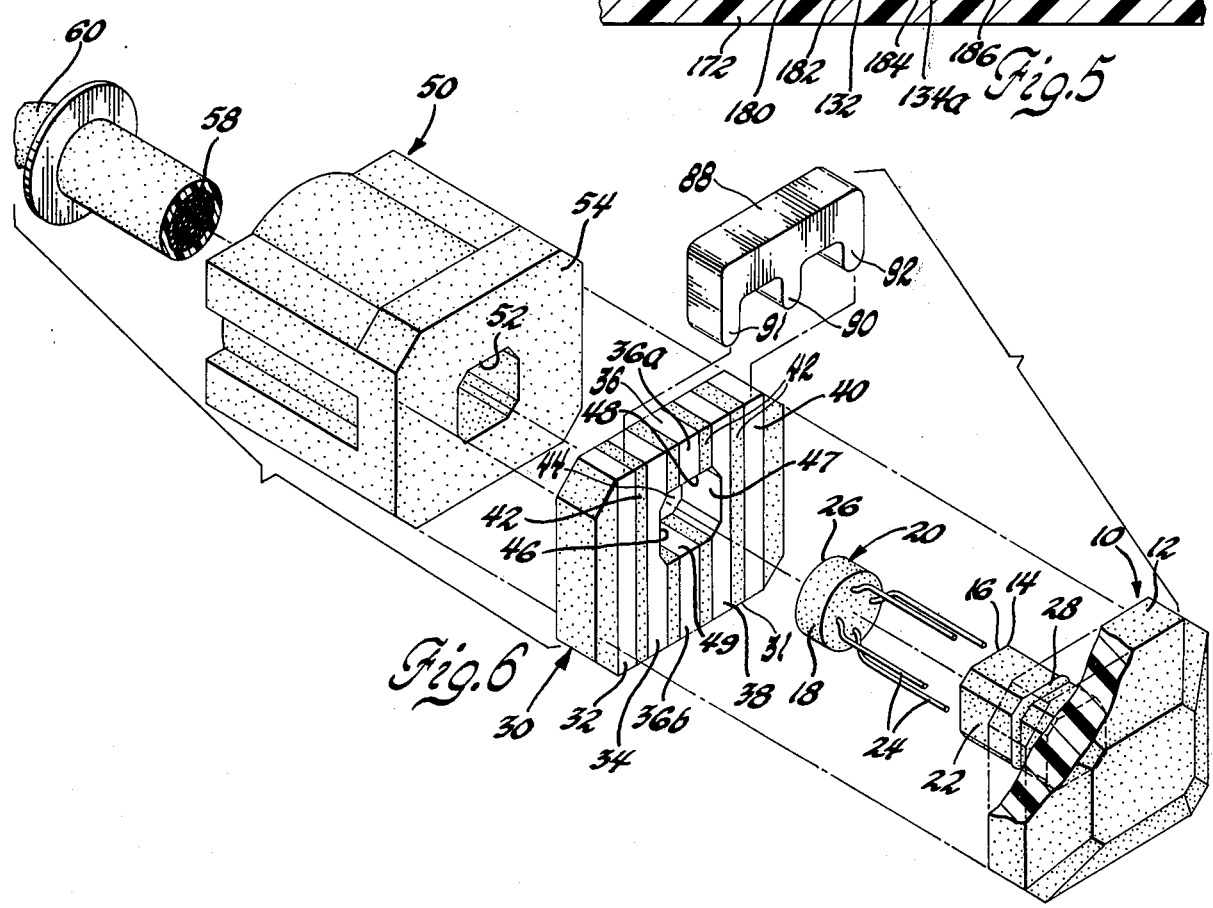
FIG. 6 is an exploded view of the embodiment shown in FIG. 1.

Referring to FIG. 6, a first housing member 10 has a flat cover portion 12 and an elongated portion 14 projecting from cover portion 12. Elongated portion 14 has a free end 16 adapted to receive the body 18 of an optic-electronic signal conversion element 20. Elongated portion 14 further has one or more sides 22, each of which is adapted to receive therealong an electric lead 24 of signal conversion element 20.

Signal conversion element 20 is any one of many devices known in the art which are adapted to convert optic signals into electric signals, electric signals into optic signals or both simultaneously. The embodiment shown in FIG. 6 is of the latter type and thus has four electric leads 24 to allow two separate communication channels. These leads 24 are accommodated on the four sides 22 of elongated portion 14. Signal conversion element 20 also includes optic signal receiving apparatus, not shown, on the far side 26 of body 18. This apparatus, of course, is also adequate for two channels, one internally connected to each pair of leads 24 so that simultaneous two-way signal conversion is possible.

An elastomeric ring 30 has a plurality of axially extending conducting layers, designated in FIG. 6 as 32, 34, 36, 38 and 40, alternating with a plurality of insulating layers referred to with the single reference numeral 42. Insulating layers 42 are formed from an insulating elastomeric material; and conducting layers 32–40 comprise an insulating elastomeric material impregnated with graphite or a similar conducting material. Long strips of said conducting and insulating elastomeric materials can be sandwiched in alternating layers; and the resulting product can be sliced perpendicular to the axis to form a plurality of such rings 30.

Elastomeric ring 30 has an axial central opening 44 therethrough which is shaped to fit tightly around elongated portion 14 inserted therethrough. In this embodiment, it is substantially square in cross section with sides 46 and 47 formed from conducting layers 34 and 38, respectively and sides 48 and 49 including the portions 36a and 36b, respectively, of conducting layer 36 separated by opening 44. When ring 30 is pushed over elongated portion 14, each of sides 46 through 49 of opening 44 presses tightly against one of the leads 24 of signal conversion element 20 so that the lead 24 is in electrical contact with the corresponding conducting layer of ring 30. A raised ridge 28 can be included on sides 22 to ensure good electrical contact between the leads 24 and the respective conducting layers of ring 30.

Figure 1:
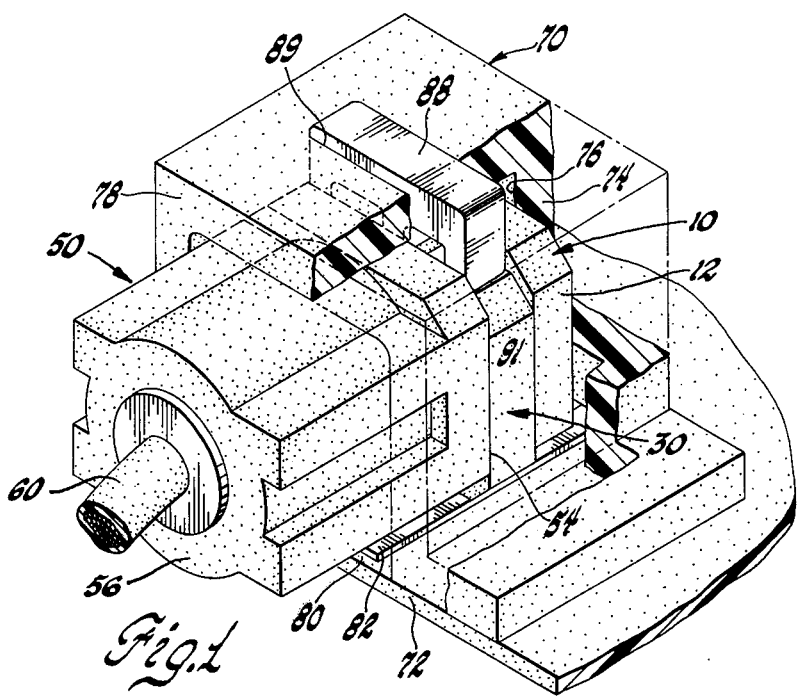
FIG. 1 is a perspective, partially cutaway view of an embodiment of this invention.

A second housing member 50 has a central axial opening 52 so that it can be pushed over elongated portion 14 of the first housing member 10 with elastomeric ring 30 sandwiched between flat cover portion 12 of first housing member 10 and an end surface 54 of second housing member 50. Central axial opening 52 is shown in FIG. 6 as square in cross section at the end surface 54 and for some axial distance therein so that it fits snugly over elongated portion 14. However, as seen in FIG. 1, the shape of central axial opening 52 at the other end surface 56 of second housing member 50 is adapted to receive the terminated end 58, seen in FIG. 6, of an optic signal conduit 60. As seen in FIG. 6, the end 58 of optic signal conduit 60 is held by second housing member 50 in axial alignment with body 18 of signal conversion element 20 so that the ends of the fiber optic elements which comprise optic signal conduit 60 are in communication with optic signal sending and/or receiving means, not shown, located on the far side 26 of body 18.

Figure 2:
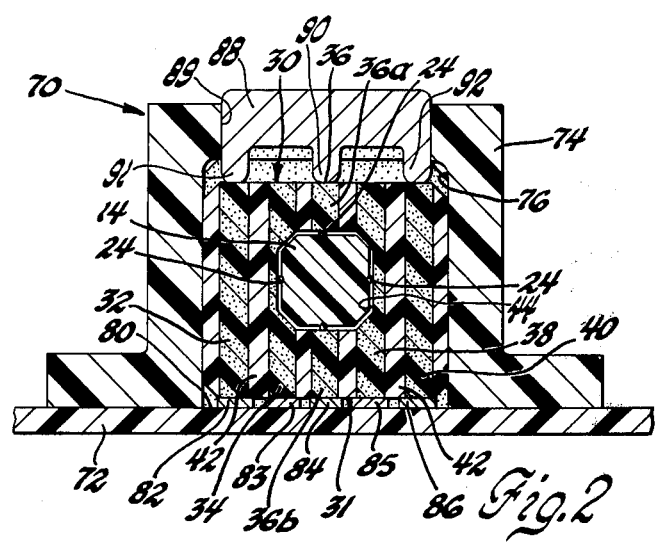
FIG. 2 is an axial section view of the embodiment shown in FIG. 1.

A third housing member 70 comprises a flat base portion 72, which might be a portion of a printed circuit board, and a U-shaped housing portion 74 mounted thereon. Portions 72 and 74 define an inner volume 76 open at least at one end 78 to receive the assembled first housing member 10, signal conversion element 20, elastomeric ring 30 and second housing member 50, as seen in FIG. 1. As seen in FIG. 2, the inner surface 80 of flat base portion 72 within inner volume 76 is provided with a number of axially oriented conducting strips 82, 83, 84, 85 and 86. These conducting strips, exaggerated in cross section area in FIG. 2 for visibility, can be typical conducting ribbons on surface 80 of flat base portion 72, if the latter is a printed circuit board.

Figure 3:
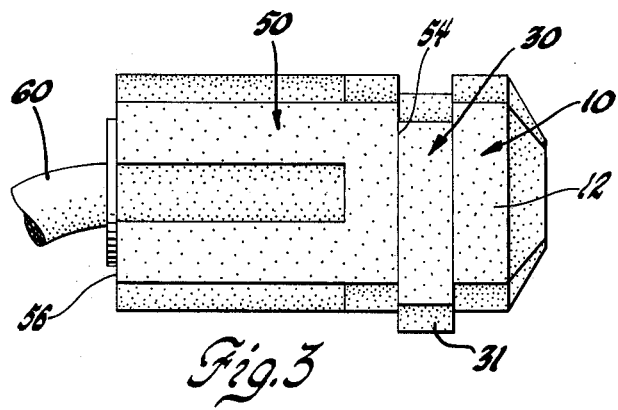
FIG. 3 is a side view of a portion of the embodiment shown in FIG. 1.

As is seen in FIG. 3, elastomeric ring 30 is formed so that a lower side 31 thereof extends outward beyond first housing member 10 and second housing member 50. Lower side 31 is pressed against surface 80 of flat base portion 72 in the assembled apparatus so that conducting layers 32, 34, 36b, 38 and 40 of elastomeric ring 30 contact, respectively, conducting strips 82, 83, 84, 85 and 86 on surface 80. Since each of conducting layers 34, 36b and 38 has in contact therewith one of the leads 24 of signal conversion element 20, these leads 24 are thus in electrical communication with conducting strips 83, 84 and 85. The fourth electric lead 24 is in contact with conducting layer 36a, which is itself not in direct contact with any of the conducting strips 82 through 86. However, a conducting and retaining key 88 in a slot 89 within U-shaped housing portion 74 has a central finger 90 which contacts conducting layer 36a and outer fingers 91 and 92 which contact conducting layers 32 and 40, respectively. The fourth lead 24 thus communicates through conducting layer 36a, member 88, and conducting layers 32 and 40 to conducting strips 82 and 86. Member 88 also helps retain the first and second housing members within the interior 76 of third housing member 70.

Figure 4:
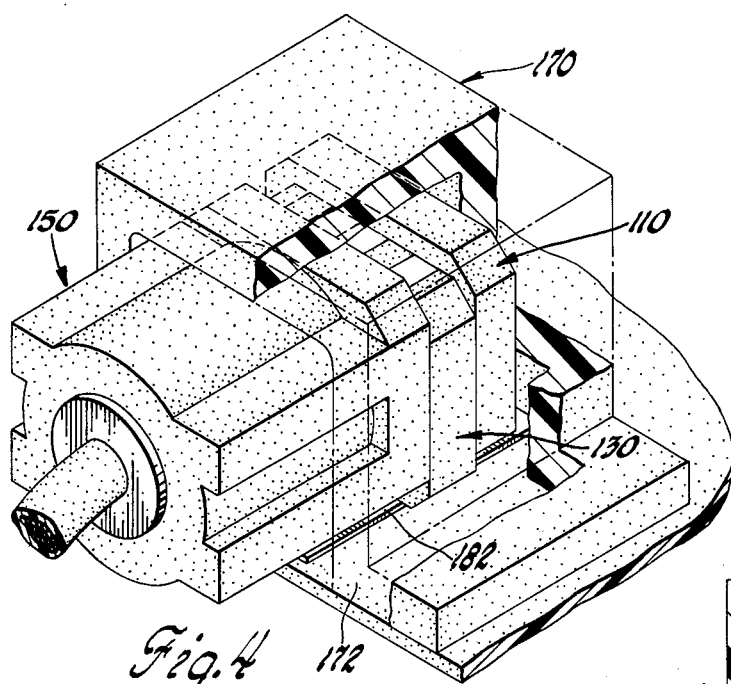
FIG. 4 is a perspective, partially cutaway view of another embodiment of this invention.
Figure 5:
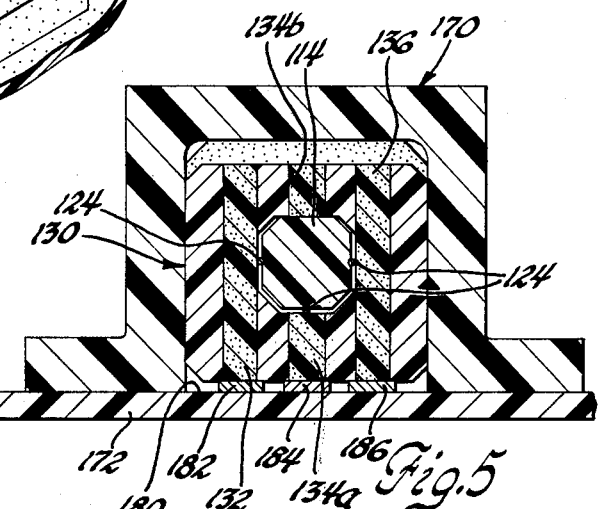
FIG. 5 is an axial section view of the embodiment shown in FIG. 4.

Another embodiment of this invention is shown in FIGS. 4 and 5. This embodiment is identical with the first described embodiment with the exception of certain changes which adapted it to a three-lead optic-electronic signal conversion element, the three leads 124 of which can be seen in FIG. 5. First housing member 110 and second housing member 150, seen in FIG. 4, are substantially identical with first housing member 10 and second housing member 50 described above. Elastomeric ring 130, however, has only three conducting layers 132, 134a and b, and 136. As seen in FIG. 5, each of the leads 124 is pressed into contact with one of the conducting layers 132, 134a and 136 by elongated portion 114 of first housing member 110. Third housing member 170 provides a flat base portion 172 having a surface 180 with axial conducting strips 182, 184 and 186 in contact with conducting layers 132, 134a and 136, respectively. Since there is no lead 124 in contact with conducting layer 134b, there is no need to provide a contact for conducting layer 134b; and, in fact, this portion is shown as conducting only because it is simpler to manufacture elastomeric ring 130 in this manner.

Although the embodiments of this invention described herein are preferred, equivalent embodiments will occur to those skilled in the art; and the scope of this invention should therefore be limited only by the claim which follows.

The embodiments of the invention in which an exclusive property or privilege is claimed are defined as follows:

1. Apparatus for connecting and interfacing the end of an optic signal conduit with electrical signal conducting means, comprising, in combination:

an optic-electronic signal conversion element having a body with means for communication with the end of the optic signal conduit and a plurality of electrically conducting leads;

a first housing member having an elongated portion with a free end adapted to receive the body of the optic-electronic signal conversion element, the elongated portion further having a plurality of sides each adapted to receive an electrically conducting lead of said signal conversion element therealong;

a second housing member having an opening adapted to receive the elongated portion of the first housing member therein and further having means adapted to receive the end of the optic signal conduit in communication with the optic-electronic signal conversion element;

an elastomeric ring comprising a plurality of axially extending layers of alternating electrically conducting and insulating elastomeric materials, the ring being disposed between the first and second housing members around the elongated portion of the first housing member with a separate layer of electrically conductive material for each electrically conducting lead biased into contact therewith, a portion of the ring including the electrically conducting layers extending outward from between the first and second housing members;

a third housing member adapted to receive the first and second housing members therein and including one or more internal electric contacts adapted to contact the electrically conducting layers of material in the outwardly extending portion of the elastomeric ring with the first and second housing members so received, the contacts communicating with the electrical signal conducting means, whereby the electrical leads of the signal conversion element are also made to communicate with the electrical signal conducting means.

* * * * *